US012689578B2

(12) United States Patent
Bleidorn et al.

(10) Patent No.: US 12,689,578 B2
(45) Date of Patent: Jul. 21, 2026

(54) REDUNDANT CONFIGURATION AND FAILOVER TESTING FOR FLEXIBLE NODAL LAYER THREE OVERLAY OF LAYER TWO TRAFFIC

(71) Applicant: Charter Communications Operating, LLC, St. Louis, MO (US)

(72) Inventors: Timothy Bleidorn, Colorado Springs, CO (US); Tomas Lovato, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 643 days.

(21) Appl. No.: 18/171,911

(22) Filed: Feb. 21, 2023

(65) Prior Publication Data

US 2024/0259294 A1 Aug. 1, 2024

Related U.S. Application Data

(60) Provisional application No. 63/442,371, filed on Jan. 31, 2023.

(51) Int. Cl.
*H04L 45/00* (2022.01)
*H04L 12/46* (2006.01)
*H04L 41/0654* (2022.01)

(52) U.S. Cl.
CPC .......... *H04L 45/22* (2013.01); *H04L 12/4633* (2013.01); *H04L 12/4641* (2013.01); *H04L 41/0654* (2013.01); *H04L 2212/00* (2013.01)

(58) Field of Classification Search
CPC . H04L 45/22; H04L 12/4633; H04L 12/4641; H04L 41/0654; H04L 2212/00
See application file for complete search history.

(56) References Cited

U.S. PATENT DOCUMENTS

| | | | | |
|---|---|---|---|---|
| 11,902,160 B2* | 2/2024 | Lin | ...................... | H04L 12/4633 |
| 2008/0172497 A1* | 7/2008 | Mohan | ................ | H04L 12/4633 |
| | | | | 709/249 |
| 2014/0036873 A1* | 2/2014 | Cheng | ............... | H04W 36/0033 |
| | | | | 370/331 |
| 2021/0184953 A1* | 6/2021 | Huang | .................... | H04L 43/20 |
| 2021/0392016 A1* | 12/2021 | Boutros | .................. | H04L 45/28 |

(Continued)

*Primary Examiner* — Angela Widhalm De Rodriguez
(74) *Attorney, Agent, or Firm* — Young Basile Hanlon & MacFarlane, P.C.

(57) ABSTRACT

Redundant configuration and testing for flexible nodal layer 3 overlay of layer 2 traffic. A network deployed at a site includes a local network to carry layer 2 traffic, a pair of layer 3 tunnel instantiation devices in a failover configuration. Each layer 3 tunnel instantiation device encapsulates the layer 2 traffic into layer 3 traffic and forwards the layer 3 traffic to a network gateway using a configurable layer 3 tunnel. A virtual client on each layer 3 tunnel instantiation device sends simulated client traffic to the network gateway via the local network and a partner layer 3 tunnel instantiation device to check end-to-end operability of the local network, the partner layer 3 tunnel instantiation device, and the network gateway. A testing layer 3 tunnel instantiation device initiates an action with respect to the partner layer 3 tunnel instantiation device based on a response to the simulated client traffic.

20 Claims, 10 Drawing Sheets

(56)                    References Cited

U.S. PATENT DOCUMENTS

2023/0111305 A1*    4/2023   Joshi ...................... H04L 45/74
                                                  370/392
2023/0216763 A1*    7/2023   Liu .................... H04L 43/0811
                                                  370/252

* cited by examiner

REDUNDANT CONFIGURATION AND FAILOVER TESTING FOR FLEXIBLE NODAL LAYER THREE OVERLAY OF LAYER TWO TRAFFIC

CROSS REFERENCE TO RELATED APPLICATION

This application claims priority to and the benefit of U.S. Provisional Application Ser. No. 63/442,371, filed on Jan. 31, 2023, the entire disclosure of which is hereby incorporated by reference.

TECHNICAL FIELD

This disclosure relates to network communications. More specifically, providing a redundant configuration and failover testing for a layer three (3) overlay which is configurable at different layer two (2) traffic points or nodes.

BACKGROUND

The Open Systems Interconnection (OSI) model is a seven layer architecture for describing communication functionality in network communications. Layer 2 of the OSI model is the data link layer and is generally associated with the Ethernet protocol and the creation and transmission of Ethernet frames. Layer 3 of the OSI model is the network layer and is generally associated with the Internet Protocol and the establishment and maintenance of routes for transmitting data.

Many commercial Wi-Fi implementations utilize layer 3 point-to-point tunneling strategies to carry layer 2 traffic across a trusted or untrusted layer 3 network. Layer 3 point-to-point tunneling encapsulates the layer 2 traffic or packets for direct point-to-point transmission across a network for the purpose of simplifying connections between tunnel endpoints in separate networks. For example, Generic Routing Encapsulation (GRE) is an example of a layer 3 point-to-point tunneling protocol. The nodal positioning of the tunnel endpoints or termination points are generally set at a centralized network gateway (NG) and either a customer premise equipment (CPE) or a controller of the CPE at a network edge.

Implementations of commercial Wi-Fi architectures continue to grow in scope and complexity. They now include more and more site-specific network requirements such as custom traffic filtering and re-direct features. These site-specific network requirements are performed in the layer 2 traffic space. Once the layer 2 traffic is encapsulated in the layer 3 tunneling space, the site-specific network requirements are unable to be executed. Consequently, a system or device for flexible and configurable placement of layer 3 tunnel endpoints within a site is needed. Moreover, the system or device needs to include a redundant configuration capability.

SUMMARY

Disclosed herein are methods and systems for redundant configuration of flexible nodal layer 3 overlay of layer 2 traffic devices. In implementations, a network deployed at a site includes a local network configured to carry layer 2 traffic, a pair of layer 3 tunnel instantiation devices deployed in a failover configuration, each layer 3 tunnel instantiation device configured to encapsulate the layer 2 traffic into layer 3 traffic and forward the layer 3 traffic to a network gateway using a configurable layer 3 tunnel, and a virtual client provisioned on each layer 3 tunnel instantiation device of the pair of layer 3 tunnel instantiation devices, each virtual client configured to send simulated client traffic to the network gateway via the local network and a partner layer 3 tunnel instantiation device of the pair of layer 3 tunnel instantiation devices to check end-to-end operability of the local network, the partner layer 3 tunnel instantiation device, and the network gateway. A testing layer 3 tunnel instantiation device of the pair of layer 3 tunnel instantiation devices is configured to initiate an action with respect to the partner layer 3 tunnel instantiation device based on a response to the simulated client traffic

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
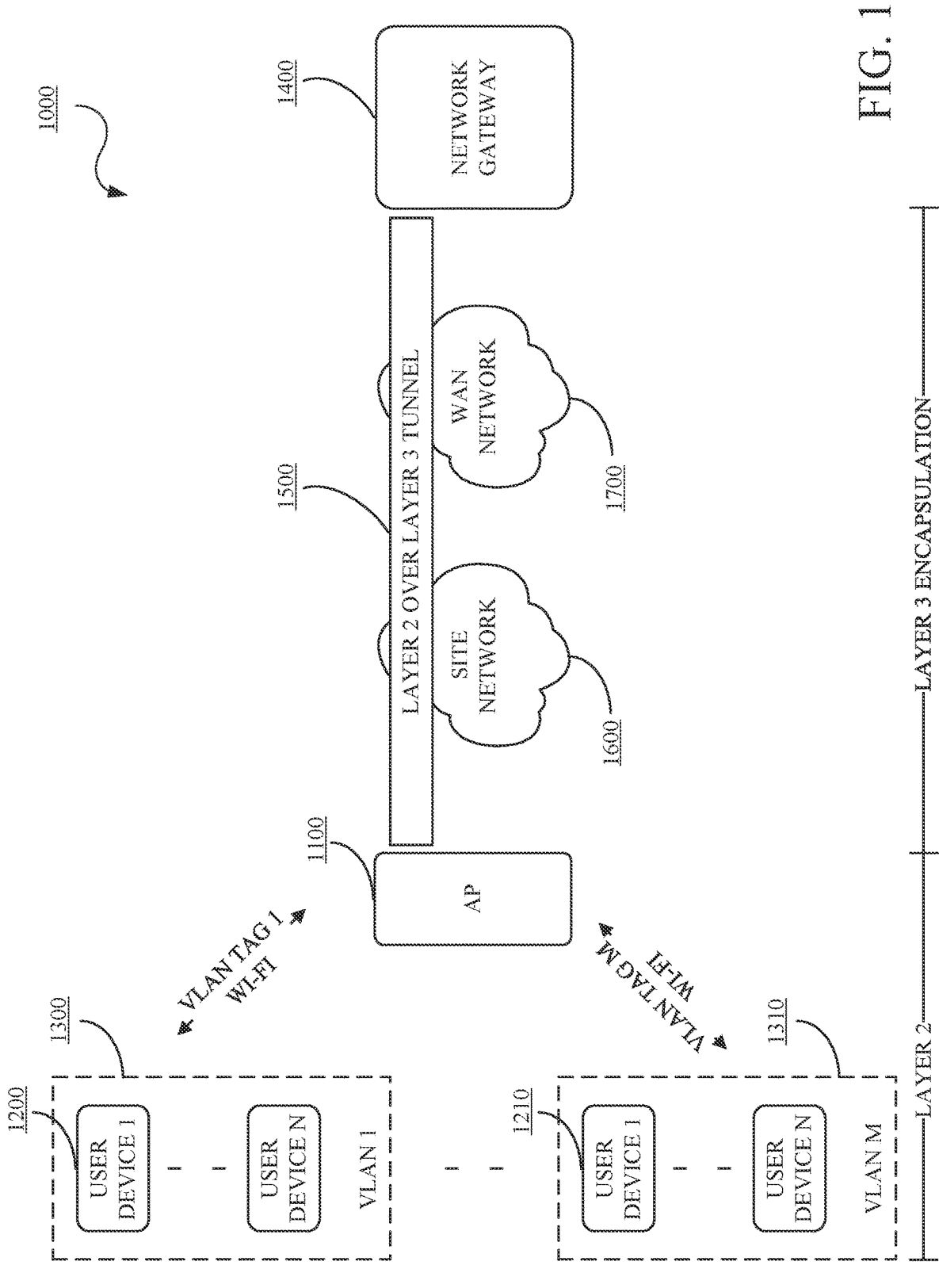
FIG. 1 is a diagram of an example of a network architecture.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example network architecture 1000. The architecture 1000 can include an access point (AP) 1100 which can provide wireless coverage, such as Wi-Fi coverage, to user devices 1, 2, . . . , N 1200 and 1210. In some implementations, the architecture 1000, the AP 1100 and the user devices 1, 2, . . . , N 1200 and 1210 can include virtual local area network (VLAN) capabilities, including hardware and software, to tag and compartmentalize wireless traffic, such as Wi-Fi traffic, using one or VLAN channels 1, 2, . . . , M 1300 and 1310 with associated VLAN tags 1, 2, . . . , M. The wireless or Wi-Fi traffic can be an example of layer 2 traffic. The AP 1100 is in communication with a network gateway (NG) 1400 via a layer 3 tunnel 1500 which traverses a site network 1600 and a wide area network (WAN) 1700.

Communications between the described elements can include wired communications, wireless communications, or a combination thereof. The quantity of described devices or elements is illustrative. The architecture 1000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The user devices 1, 2, . . . , N 1200 and 1210 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the AP 1100.

The AP 1100 can be, but is not limited to, a base station, an access point, an access node, or like device which enables radio communications access between, for example, the user devices 1, 2, . . . , N 1200 and 1210 to other devices, such as, the NG 1400. For example, the AP 1100 can serve as the Wi-Fi service det identifier (SSID) base station and can perform encapsulation of user devices 1, 2, . . . , N 1200 and 1210 frames for tunneled transport to the NG 1400. The AP 1100 can be or function as one tunnel endpoint for the layer 3 tunnel 1500. The AP 1100 encapsulates the layer 2 traffic to generate layer 3 traffic or layer 3 encapsulated traffic, which is sent over the layer 3 tunnel 1500 to the NG 1400. The layer 3 tunnel 1500 acts as a point-to-point overlay to allow for layer 2 (Ethernet) communication over multiple disparate networks.

The NG 1400 can perform as the other tunnel endpoint and can facilitate layer 3 gateway services, such as access to the Internet, to the user devices 1, 2, . . . , N 1200 and 1210. The NG 1400, for example, can be at a service provider headend.

The site network 1600 can consist of local network devices and connections owned and managed by a specific site. The site network 1600 may include network functions that inspect, filter, and/or otherwise apply site-specific policy to user device traffic, such as the user devices 1, 2, . . . , N 1200 and 1210.

The WAN network 1700 can consist of any arbitrary Internet backhaul network or Internet service provider (ISP) network providing a commercial Wi-Fi solution. As such the individual network hops (e.g., routers and/or switches) between the AP 1100 and the NG 1400 are obfuscated from the user device and the end station to which a specific flow may be destined.

In general, an encapsulation point for the layer 3 tunnel 1500 is instantiated at or on the AP 1100. Therefore, the encapsulation point is static with respect to the network architecture 1000. This means or results in the layer 2 domain being limited to the space between the user devices 1, 2, . . . , N 1200 and 1210 and the AP 1100 since once traffic traverses the encapsulation point of the AP 1100, the traffic is encapsulated in a layer 3 protocol. Further, the layer 3 encapsulated domain extends from the encapsulation point of the AP 1100 to the NG 1400. This encapsulation point instantiation, therefore, has the potential to break site specific functions that rely on the traffic passing a specific point in the site network 1600 before being encapsulated.

For example, many site-specific filtering and policy solutions and/or functions operate at or in the layer 2 domain. The placement of the layer 3 tunneling function within a network topology is therefore critical, and often dictates future services capabilities of the site. Tunneling (encapsulation of the user device traffic by the AP 1100) may prevent these site functions from performing their task due to a layer of obfuscation applied by the encapsulation function of the AP 1100. To the extent the site network 1600 employs site-specific network requirements, these site-specific network requirements are bypassed at the instantiation point, i.e., at the AP 1100, of the layer 3 tunnel 1500. That is, the site-specific network requirements are unexecuted. A need therefore arises for flexibly deployable and configurable layer 3 tunnel instantiation devices and methods.

Figure 2:
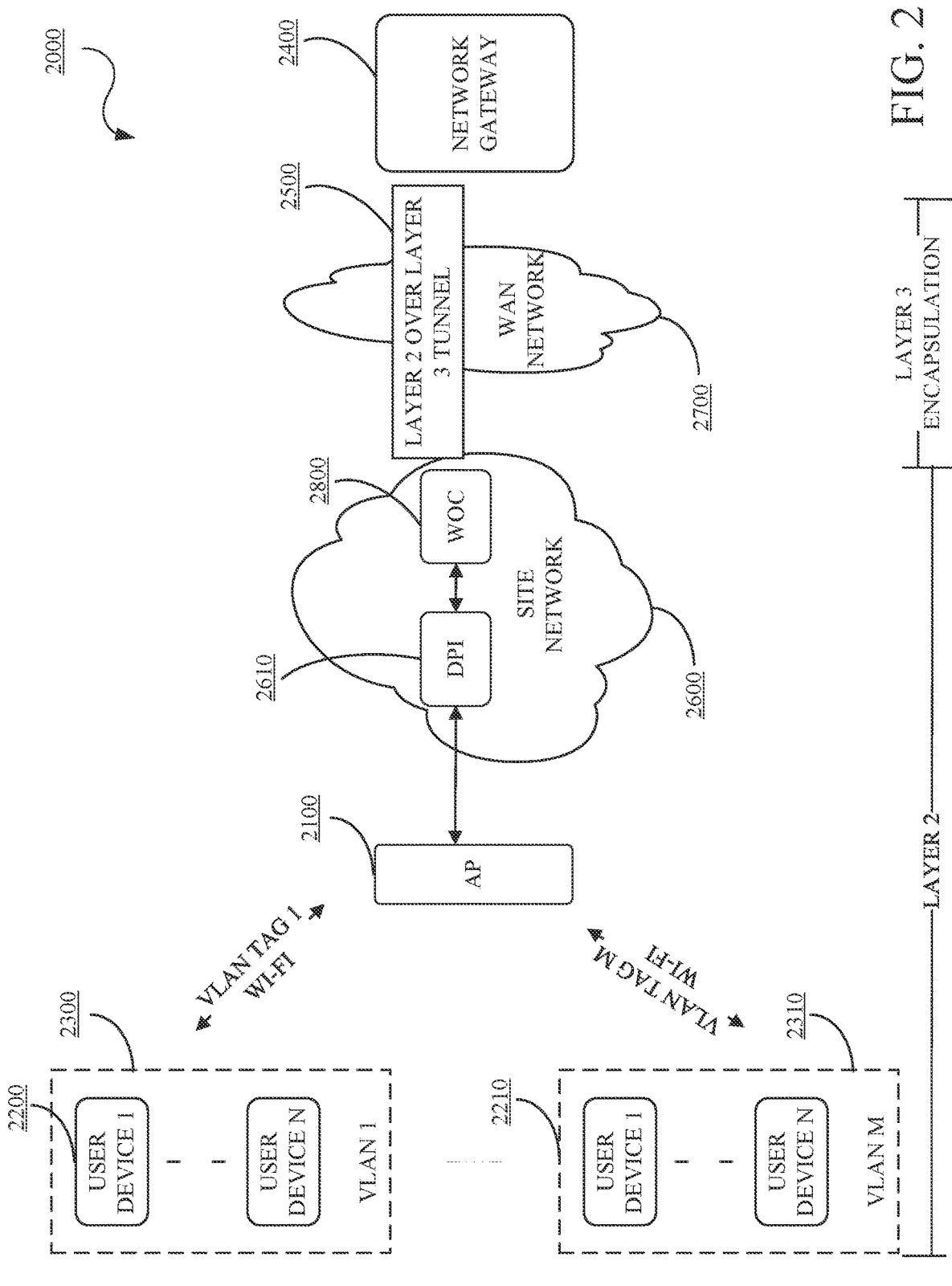
FIG. 2 is a diagram of an example of a network architecture with a layer 3 tunnel instantiation device in accordance with embodiments of this disclosure.

FIG. 2 is a diagram of an example network architecture 2000 including a layer 3 tunnel instantiation device 2800 in accordance with some implementations. The layer 3 tunnel instantiation device 2800 is described in U.S. patent application Ser. No. 17/731,440, filed Apr. 28, 2022, entitled "Flexible Nodal Layer Three Overlay Of Layer Two Traffic", which is herein incorporated by reference as if set forth herein.

The architecture 2000 can include an AP 1100 which can provide wireless coverage, such as Wi-Fi coverage, to user devices 1, 2, . . . , N 2200 and 2210. In some implementations, the architecture 2000, the AP 2100 and the user devices 1, 2, . . . , N 2200 and 2210 can include VLAN capabilities, including hardware and software, to tag and compartmentalize wireless traffic, such as Wi-Fi traffic, using one or VLAN channels 1, 2, . . . , M 2300 and 2310 with associated VLAN tags 1, 2, . . . , M. The wireless or Wi-Fi traffic can be an example of layer 2 traffic. The AP 2100 is in communication with a network gateway (NG) 2400 via the layer 3 tunnel instantiation device 2800 (represented as a WOC in FIG. 2) and a layer 3 tunnel 2500 which traverses a site network 2600 and a WAN 2700. In some implementations, the site network 2600 can include a DPI 2610. Communications between the described devices or elements can include wired communications, wireless communications, or a combination thereof. The architecture 2000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The user devices 1, 2, . . . , N 2200 and 2210 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the AP 2100.

The AP 2100 can be, but is not limited to, a base station, an access point, an access node, or like device which enables radio communications access between, for example, the user devices 1, 2, . . . , N 2200 and 2210 to other devices, such as, the WOC 2800. The AP 2100 operates at or in the layer 2 domain. For example, the AP 2100 can serve as the Wi-Fi service det identifier (SSID) base station and forward user device traffic data through the site network 2600 toward the layer 3 tunnel instantiation device 2800. In some implementations, some VLAN channels can be offloaded or purged to networks internal to the site network 2600 instead of being forwarded to the layer 3 tunnel instantiation device 2800. This can occur at the AP 2100, the DPI 2610, or other points prior to the layer 3 tunnel instantiation device 2800.

The layer 3 tunnel instantiation device 2800 can be or function as one tunnel endpoint for the layer 3 tunnel 2500. The layer 3 tunnel instantiation device 2800 can perform encapsulation of frames from user devices 1, 2, . . . , N 2200 and 2210 for tunneled transport to the NG 2400. The layer 3 tunnel instantiation device 2800 encapsulates the layer 2 traffic to generate layer 3 traffic or layer 3 encapsulated traffic, which is sent over the layer 3 tunnel 2500 to the NG 2400. The layer 3 tunnel 2500 acts as a point-to-point overlay to allow for layer 2 (Ethernet) communication over multiple disparate networks. In some implementations, the layer 3 tunnel instantiation device 2800 can handle multiple user device traffic data such as multiple VLAN channels with associated VLAN tags. Each VLAN channel can be handled and encapsulated in accordance with its policies and requirements.

The NG 2400 can perform as the other tunnel endpoint and can facilitate layer 3 gateway services, such as access to the Internet, to the user devices 1, 2, . . . , N 2200 and 2210. The NG 2400, for example, can be at a service provider headend. That is, the network gateway 2400 can provide offload gateway and network anchoring functions to the user devices 1, 2, . . . , N 2200 and 2210.

The site network 2600 can consist of local network devices and connections owned and managed by a specific site. The site network 2600 may include network functions that inspect, filter, and/or otherwise apply site-specific policy to user device traffic, such as the user devices 1, 2, . . . , N 2200 and 2210. These network functions are represented as the DPI 2610 in FIG. 2. The DPI 2610 is a site network 2600 requirement for assessing traffic to and from the user devices 1, 2, . . . , N 2200 and 2210. The DPI 2610 operates on layer 2 traffic. Traffic forwarded by the AP 2100 is processed by the DPI 2610 prior to processing by the layer 3 tunnel instantiation device 2800.

The WAN network 2700 can consist of any arbitrary Internet backhaul network or ISP network providing a commercial Wi-Fi solution. As such the individual network hops (e.g., routers and/or switches) between the layer 3 tunnel instantiation device 2800 and the NG 2400 are obfuscated from the user device and the end station to which a specific flow may be destined.

The AP 2100 and the layer 3 tunnel instantiation device 2800 are logically and/or physically decoupled with respect to an encapsulation function. Operationally, this permits the layer 3 tunnel instantiation device 2800 to be placed in accordance with the requirements and policies of the site network 2600. The layer 2 domain can be extended beyond the DPI 2610 to facilitate site network 2600 requirements that all user device traffic be inspected. The instantiation of the layer 3 tunnel 2500 endpoint is now terminated closer to an edge of the site network 2600. The layer 3 tunnel instantiation device 2800 may be referred to as a configurable endpoint constructor or Wi-Fi offload concentrator (WOC) (collectively "layer 3 tunnel instantiation device").

The layer 3 tunnel instantiation device can provide a means to selectively place offload-tunneling functions almost anywhere within the network topology or site to consolidate traffic to a centralized network gateway. That is, deployment of the layer 3 tunnel is configurable. In some implementations, the layer 3 tunnel instantiation device can support and/or use industry-standard and/or proprietary encapsulation methods for layer 2 user device or client traffic. The layer 3 tunnel instantiation device can selectively expand or contract the native layer 2 reach within a site infrastructure or network topology based on site specific requirements. Moreover, decoupling of the encapsulation or tunneling functionality from an access point or other like device permits increased offload opportunities such as, but not limited to, VLAN purging.

The layer 3 tunnel instantiation device can extend the layer 2 domain beyond site specific traffic policy functionality. Consequently, site specific traffic policy functionality can be applied to user device traffic and still get the benefit of layer 3 tunneling to the network gateway. For example, user device traffic can be inspected with respect to site policies regarding betting, pornography, security, malware, proprietary information, client information, or other policies. In this instance, the layer 3 tunnel instantiation device is instantiated close to the site or network edge.

During operation, a single layer 3 tunnel instantiation device may experience a failure that prevents proper offload functionality. A redundant or failover configuration employing multiple layer 3 tunnel instantiation devices can be used to provide continuity of service. In the failover configuration, one of the multiple layer 3 tunnel instantiation devices is an active layer 3 tunnel instantiation device while the remaining layer 3 tunnel instantiation devices are in standby mode. Each multiple layer 3 tunnel instantiation device can perform failover or heartbeat testing to determine a health of another of the layer 3 tunnel instantiation devices. In the instance of a failure of the active layer 3 tunnel instantiation device, the standby layer 3 tunnel instantiation device can provide encapsulated offload transport in its stead. In the instance of a successful health check of the active layer 3 tunnel instantiation device, the standby layer 3 tunnel instantiation device can assume the active layer 3 tunnel instantiation device is capable of fulfilling client connectivity requests.

Each layer 3 tunnel instantiation device can include a virtual client, such as a virtual Dynamic Host Configuration Protocol (DHCP) client, and dedicated and/or unique VLANs or VLAN tags (simulated client traffic receiving/sending interfaces) (to establish VLAN segregation from client traffic VLANs) to provide a heartbeat between two layer 3 tunnel instantiation devices that can measure an end-to-end disposition of the Wi-Fi offload service through a relatively simple DHCP exchange. Each layer 3 tunnel instantiation device can further include timing parameters, failure counters, and/or other configuration parameters or knobs that automatically and/or on-demand facilitate the virtual client check and track the status of a partner layer 3 tunnel instantiation device.

The heartbeat or failover configuration and/or method does not simply detect the presence of another layer 3 tunnel instantiation device but validates the functionality of the service provided by the network gateway and/or other functionality. That is, the end-to-end health check exercises multiple end-to-end validation considerations. These exercises multiple end-to-end validation considerations can include, but is not limited to, functional operation of a partner layer 3 tunnel instantiation device's internal trunk and physical interface, functional operation of a partner layer 3 tunnel instantiation device's bridge interface and layer 2 forwarding function, functional operation of a partner layer 3 tunnel instantiation device's tunneling encapsulation and configuration, functional operation of a network gateway tunnel service endpoint, functional operation of a network gateway subscriber management and policy functions, functional operation of a core authentication, authorization, and accounting (AAA) servers, subscriber databases, and policy control, functional operation of a local network between partner layer 3 tunnel instantiation devices, functional operation of a connecting network between the partner layer 3 tunnel instantiation devices and the network gateway, functional operation of a connecting network between the partner layer 3 tunnel instantiation devices and national datacenters, core, and/or back office infrastructure, and/or functional operation of subscriber services provided by the network gateway.

Figure 3:
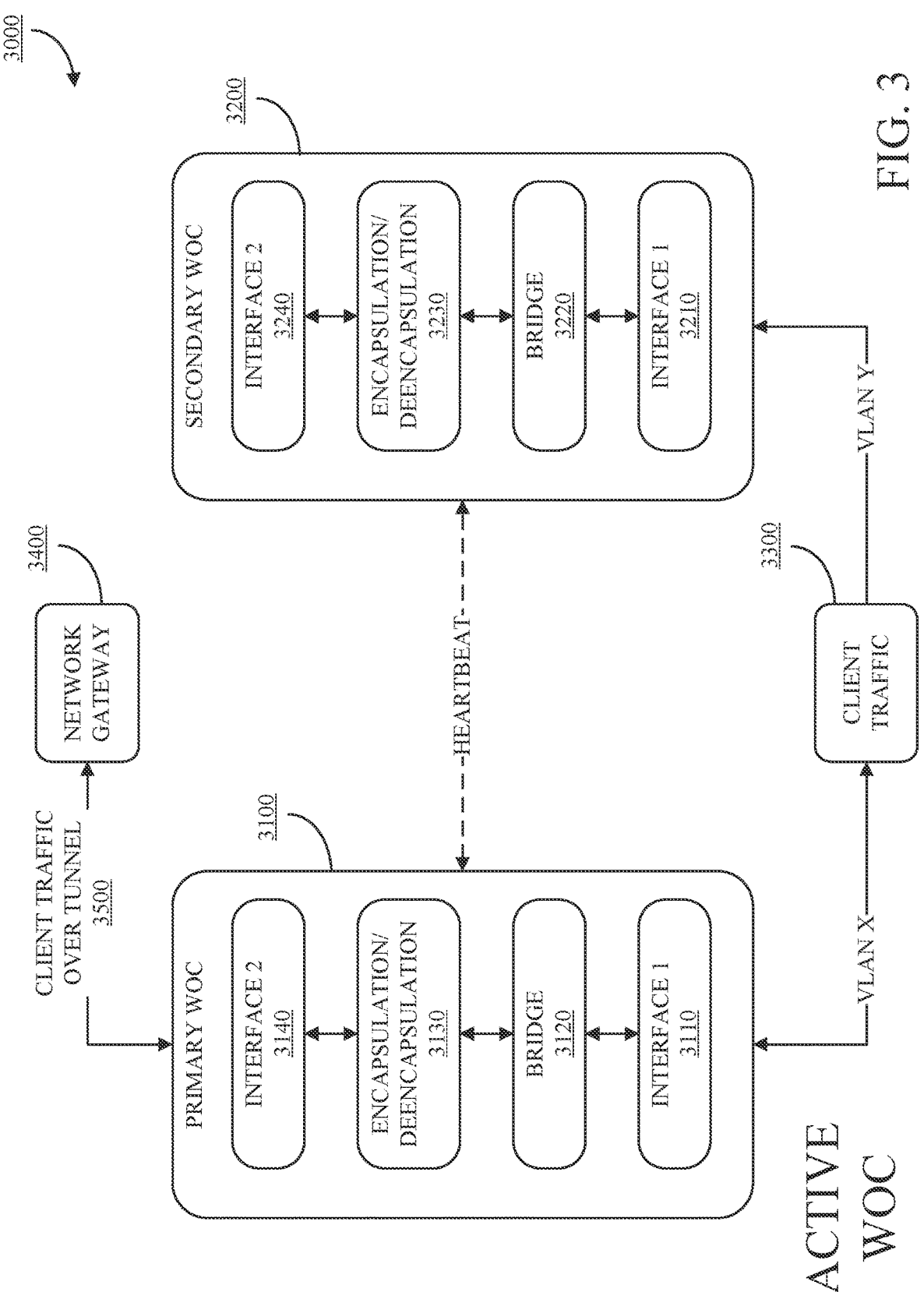
FIG. 3 is a block diagram of an example of a redundant configuration for layer 3 tunnel instantiation devices in accordance with embodiments of this disclosure.
Figure 4:
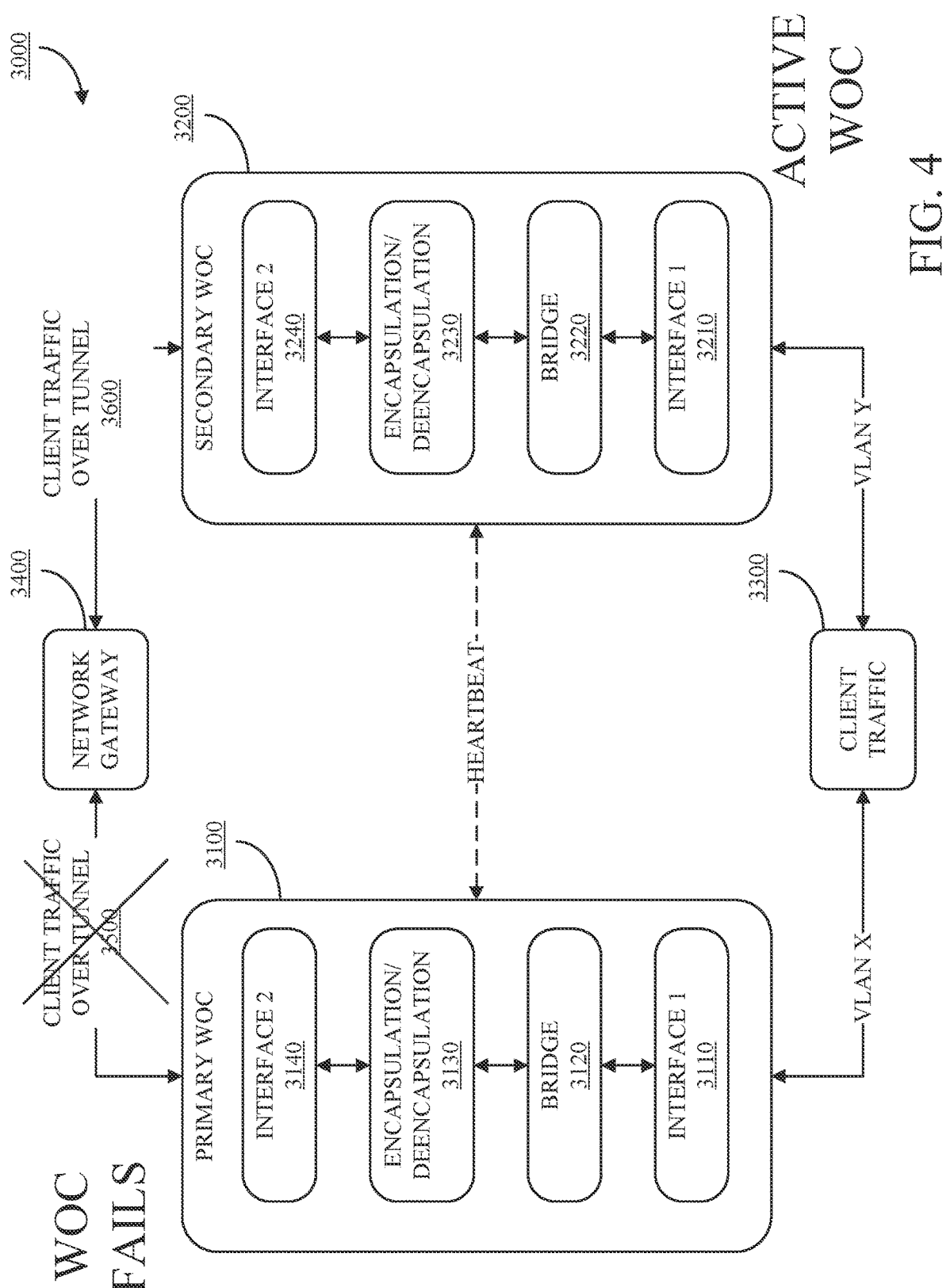
FIG. 4 is a block diagram of an example of a layer 3 tunnel instantiation device in a failover configuration in accordance with embodiments of this disclosure.

FIG. 3 and FIG. 4 are a block diagram of an example network architecture 3000 which includes a primary layer 3 tunnel instantiation device 3100 and a secondary layer 3 tunnel instantiation device 3200 in a redundant or failover configuration in accordance with embodiments of this disclosure. The network architecture 3000 can include client traffic 3300 coming from user devices and access points over VLANs, as described in FIG. 2, which is processed or handled by an active one of the primary layer 3 tunnel instantiation device 3100 and the secondary layer 3 tunnel instantiation device 3200 as described herein, and directed to a network gateway 3400 for handling as described in FIG. 2. The network architecture 3000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The layer 3 tunnel instantiation device 3100 can include, but is not limited to, an interface 1 3110, a bridge 3120, an encapsulation/de-encapsulation 3130, and an interface 2 3140. The layer 3 tunnel instantiation device 3200 can include, but is not limited to, an interface 1 3210, a bridge 3220, an encapsulation/de-encapsulation 3230, and an interface 2 3240. The layer 3 tunnel instantiation devices 3100 and 3200 can be the layer 3 tunnel instantiation device 2800 in FIG. 2. The layer 3 tunnel instantiation devices 3100 and 3200 can receive client or user device traffic 3300, such as via one or more VLAN channels, from user devices (or transmit de-encapsulated traffic to the user devices). The layer 3 tunnel instantiation devices 3100 and 3200 can send encapsulated user device traffic to the NG 3400 (or receive traffic from the NG 3400) using a layer 3 tunnel 3500 or a layer 3 tunnel 3600, respectively, depending on which one is active. The layer 3 tunnel instantiation devices 3100 and 3200 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The network gateway 3400 can perform as a far-end tunnel endpoint of the layer 3 tunnel 3500 and 3600 and can facilitate layer 3 gateway services, such as access to the Internet, for the client traffic 3300. That is, the network gateway 3400 can provide offload gateway and network anchoring functions to the devices sending the client traffic 3300.

Each of the interface 1 3110 and the interface 1 3210, respectively, are access point facing interfaces which receive client traffic 3300 via VLANs. Each of the interface 1 3110 and the interface 1 3210 provide physical and/or logical connectivity to the bridge 3120 and the bridge 3220, respectively.

Each bridge 3120 and the bridge 3220 can handle one or more layer 2 client traffic streams, consolidate for transmission, and forward to the encapsulation/de-encapsulation 3130 and the encapsulation/de-encapsulation 3230, respectively. In a reverse direction, each bridge 3120 and the bridge 3220 can handle one or more layer 2 client traffic streams for transmission toward an access point. Each bridge 3120 and the bridge 3220 is a bi-directional switch which facilitates communication between the encapsulation/de-encapsulation 3130 and the encapsulation/de-encapsulation 3230, respectively, and the access point and/or user devices.

Each of the encapsulation/de-encapsulation 3130 and the encapsulation/de-encapsulation 3230 can encapsulate client traffic stream (layer 2 packets) to generate layer 3 packets.

In some implementations, the type of encapsulation can be based on the characteristics or policies of the user device traffic stream. In a reverse direction, each of the encapsulation/de-encapsulation 3130 and the encapsulation/de-encapsulation 3230 can de-encapsulate layer 3 packets to generate layer 2 packets, which are then forwarded to the bridge 3120 or bridge 3220, respectively. That is, each of the encapsulation/de-encapsulation 3130 and the encapsulation/de-encapsulation 3230 are bi-directional devices.

Each of the interface 2 3140 and the interface 2 3240 are network gateway facing interfaces which receive layer 3 encapsulated packets for transmission to the network gateway 3400, or the encapsulation/de-encapsulation 3130 or the encapsulation/de-encapsulation 3230, respectively, and as appropriate.

Each of the primary layer 3 tunnel instantiation device 3100 and the secondary layer 3 tunnel instantiation device 3200 can implement heartbeat or failover signaling as described herein to determine a functional and/or operational health of the other of the primary layer 3 tunnel instantiation device 3100 and the secondary layer 3 tunnel instantiation device 3200.

Operationally, one of the primary layer 3 tunnel instantiation device 3100 and the secondary layer 3 tunnel instantiation device 3200 is an active layer 3 tunnel instantiation device. In FIG. 3, the primary layer 3 tunnel instantiation device 3100 is the active layer 3 tunnel instantiation device. Client traffic 3300, i.e., layer 2 traffic, is routed with or provided via a VLAN or VLAN tag (i.e., VLAN X and/or VLAN Y) toward the interface 1 3110, e.g., a subscriber facing interface. The primary layer 3 tunnel instantiation device 3100 processes and/or handles the layer 2 client traffic by layer 3 encapsulating the layer 2 client traffic via the encapsulation/deencapsulation 3130 and forwarding the encapsulated client traffic to the network gateway 3400 via the interface 2 3140 and the tunnel 3500. The client traffic 3300 is dropped by the secondary layer 3 tunnel instantiation device 3200 when the primary layer 3 tunnel instantiation device 3100 is active. That is, a non-active layer 3 tunnel instantiation device receives but does not process client traffic.

In accordance with a defined timer and/or on an on-demand basis, the primary layer 3 tunnel instantiation device 3100 and the secondary layer 3 tunnel instantiation device 3200 can initiate heartbeat or failover signaling to the other of the secondary layer 3 tunnel instantiation device 3200 and the primary layer 3 tunnel instantiation device 3100, respectively. In the instance that the secondary layer 3 tunnel instantiation device 3200 detects that the primary layer 3 tunnel instantiation device 3100 is unable to process the client traffic 3300, the secondary layer 3 tunnel instantiation device 3200 becomes inactive and the primary layer 3 tunnel instantiation device 3100 goes offline as shown in FIG. 4. The secondary layer 3 tunnel instantiation device 3200 processes and/or handles the layer 2 client traffic by layer 3 encapsulating the layer 2 client traffic via the encapsulation/deencapsulation 3230 and forwarding the encapsulated client traffic to the network gateway 3400 via the interface 2 3240 and the tunnel 3600.

Figure 5:
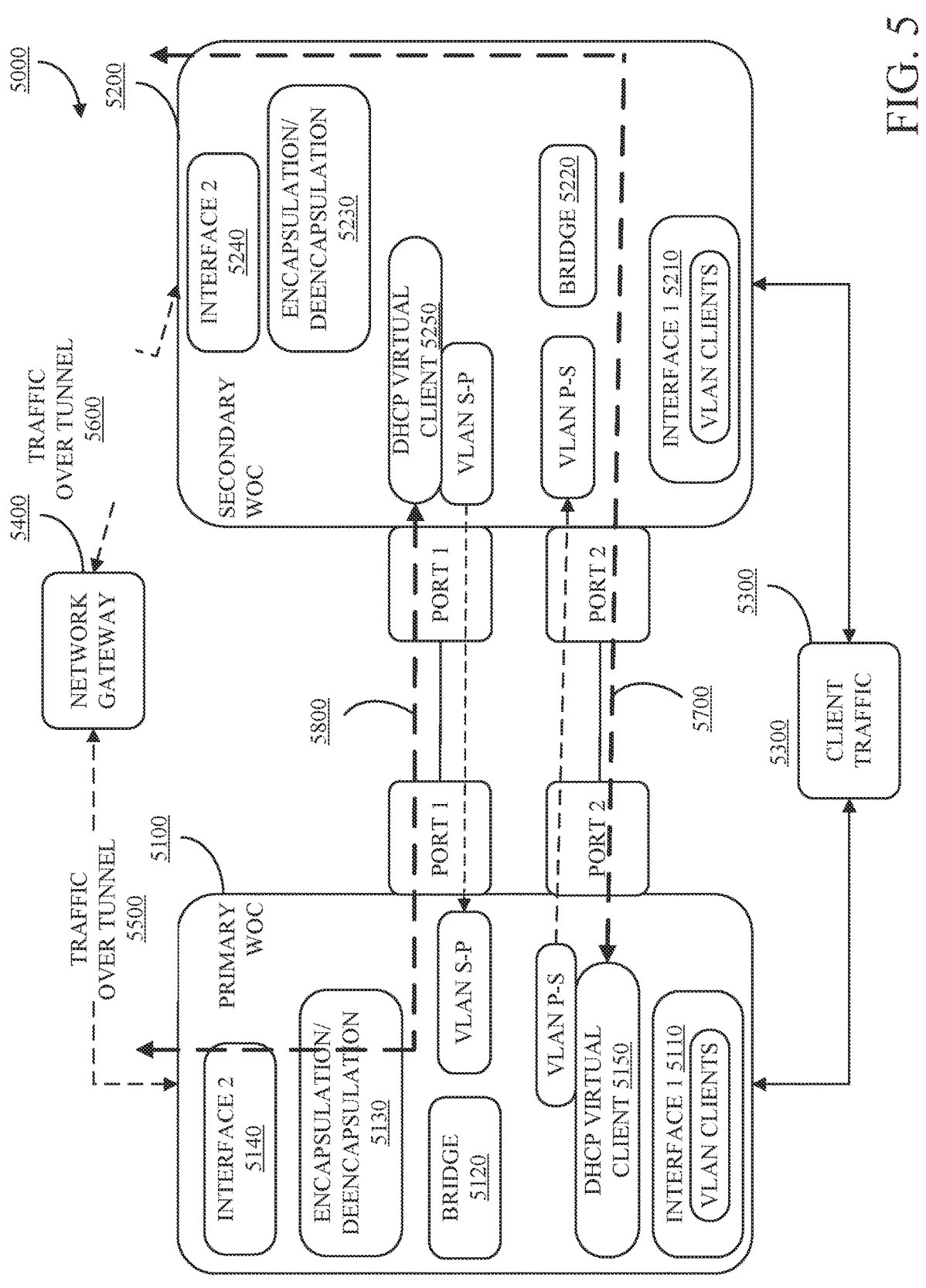
FIG. 5 is a block diagram of an example of a redundant configuration for layer 3 tunnel instantiation devices with failover testing in accordance with embodiments of this disclosure.

FIG. 5 is a block diagram of an example network architecture 5000 which includes a primary layer 3 tunnel instantiation device 5100 and a secondary layer 3 tunnel instantiation device 5200 in a redundant or failover configuration in accordance with embodiments of this disclosure. The network architecture 5000 illustrates both physical and logical connections to enable health or failover checking. The network architecture 5000 can include client traffic 5300 coming from user devices and access points over VLANs, as described in FIG. 2, which is processed or handled by an active one of the primary layer 3 tunnel instantiation device 5100 and the secondary layer 3 tunnel instantiation device 5200 as described herein, and directed to a network gateway 5400 for handling as described in FIG. 2. The network architecture 5000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The layer 3 tunnel instantiation device 5100 can include, but is not limited to, an interface 1 3110, a bridge 3120, an encapsulation/de-encapsulation 3130, an interface 2 3140, and a DHCP virtual client 5150. The layer 3 tunnel instantiation device 5200 can include, but is not limited to, an interface 1 5210, a bridge 5220, an encapsulation/de-encapsulation 5230, an interface 2 5240, and a DHCP virtual client 5250. The layer 3 tunnel instantiation devices 5100 and 5200 can be the layer 3 tunnel instantiation device 2800 in FIG. 2 and the respective layer 3 tunnel instantiation devices 3100 and 3200 in FIG. 3 and FIG. 4. The layer 3 tunnel instantiation devices 5100 and 5200 can receive client or user device traffic 5300, such as via one or more VLAN client channels, from user devices (or transmit de-encapsulated traffic to the user devices). The layer 3 tunnel instantiation devices 5100 and 5200 can send encapsulated user device traffic to the NG 5400 (or receive traffic from the NG 5400) using a layer 3 tunnel 5500 or a layer 3 tunnel 5600, respectively, depending on which one is active. The layer 3 tunnel instantiation devices 5100 and 5200 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The network gateway 5400 can perform as a far-end tunnel endpoint of the layer 3 tunnel 5500 and 5600 and can facilitate layer 3 gateway services, such as access to the Internet, for the client traffic 5300. That is, the network gateway 5400 can provide offload gateway and network anchoring functions to the devices sending the client traffic 5300.

Each of the interface 1 3110 and the interface 1 3210, respectively, are access point facing interfaces which receive client traffic 5300 via VLANs (shown as VLAN clients in FIG. 5). Each of the interface 1 5110 and the interface 1 5210 provide physical and/or logical connectivity to the bridge 5120 and the bridge 5220, respectively.

Each bridge 5120 and the bridge 5220 can handle one or more layer 2 client traffic streams, consolidate for transmission, and forward to the encapsulation/de-encapsulation 5130 and the encapsulation/de-encapsulation 5230, respectively. In a reverse direction, each bridge 5120 and the bridge 5220 can handle one or more layer 2 client traffic streams for transmission toward an access point. Each bridge 5120 and the bridge 5220 is a bi-directional switch which facilitates communication between the encapsulation/de-encapsulation 5130 and the encapsulation/de-encapsulation 5230, respectively, and the access point and/or user devices.

Each of the encapsulation/de-encapsulation 5130 and the encapsulation/de-encapsulation 5230 can encapsulate client traffic stream (layer 2 packets) to generate layer 3 packets.

In some implementations, the type of encapsulation can be based on the characteristics or policies of the user device traffic stream. In a reverse direction, each of the encapsulation/de-encapsulation 5130 and the encapsulation/de-encapsulation 5230 can de-encapsulate layer 3 packets to generate layer 2 packets, which are then forwarded to the bridge 5120 or bridge 5220, respectively. That is, each of the encapsulation/de-encapsulation 5130 and the encapsulation/de-encapsulation 5230 are bi-directional devices.

Each of the interface 2 5140 and the interface 2 5240 are network gateway facing interfaces which receive layer 3 encapsulated packets for transmission to the network gateway 5400, or the encapsulation/de-encapsulation 5130 or the encapsulation/de-encapsulation 5230, respectively, and as appropriate.

Each of the DHCP virtual client 5150 and/or the DHCP virtual client 5250 can simulate client traffic destined for the NG 5400, i.e., this can be referred to as heartbeat or failover testing or signaling as between the primary layer 3 tunnel instantiation device 5100 and the secondary layer 3 tunnel instantiation device 5200. That is, each of the DHCP virtual client 5150 and/or the DHCP virtual client 5250 can initiate a DHCP message transaction to obtain an Internet Protocol (IP) address from the NG 5400. The simulated client traffic is processed by the secondary layer 3 tunnel instantiation device 5200 or the primary layer 3 tunnel instantiation device 5100, respectively, which in turn tests operability and/or functionality of the secondary layer 3 tunnel instantiation device 5200 or the primary layer 3 tunnel instantiation device 5100, respectively.

The heartbeat or failover signaling between the primary layer 3 tunnel instantiation device 5100 and the secondary layer 3 tunnel instantiation device 5200 is carried out over or uses the same local network or VLAN infrastructure that supports client traffic, i.e., the VLAN clients. Each of the primary layer 3 tunnel instantiation device 5100 and the secondary layer 3 tunnel instantiation device 5200 is associated with or provided a dedicated VLAN channel or tag that is separate and/or distinct from the VLAN clients. In FIG. 5, the VLAN channel for testing the primary layer 3 tunnel instantiation device 5100 is logically represented by PORT 1 and VLAN S-P (collectively VLAN S-P), and the VLAN channel for testing the secondary layer 3 tunnel instantiation device 5200 is logically represented by PORT 2 and VLAN P-S (collectively VLAN P-S). That is, the totality of the VLAN channels includes the VLAN clients, the VLAN S-P, and the VLAN P-S, which are all part of the same VLAN infrastructure.

Operationally, the network architecture 5000 operates for client traffic is as described herein.

Operationally, for failover testing of the secondary layer 3 tunnel instantiation device 5200, the DHCP virtual client 5150 can attempt to do a DHCP call or exchange with the NG 5400 over VLAN P-S and via the secondary layer 3 tunnel instantiation device 5200. The DHCP virtual client 5150 attempts to obtain an IP address from the NG 5400 using the secondary layer 3 tunnel instantiation device 5200 including usage of the interface 1 5210, the bridge 5220, the encapsulation/de-encapsulation 5230, and the interface 2 5240. The secondary layer 3 tunnel instantiation device 5200 attempts to receive and intake, encapsulate, and forward the DHCP call to the NG 5400, and process the return message back to the DHCP virtual client 5150 to facilitate communication 5700 between the DHCP virtual client 5150 and the NG 5400. In implementations, a failure determination may be indicated after a defined number of failed attempts to obtain the IP address.

Operationally, for failover testing of the primary layer 3 tunnel instantiation device 5100, the DHCP virtual client 5250 can attempt to do a DHCP call or exchange with the NG 5400 over VLAN S-P and via the secondary layer 3 tunnel instantiation device 5100. The DHCP virtual client 5250 attempts to obtain an IP address from the NG 5400 using the primary layer 3 tunnel instantiation device 5100 including usage of the interface 1 5110, the bridge 5120, the encapsulation/de-encapsulation 5130, and the interface 2 5140. The primary layer 3 tunnel instantiation device 5100 attempts to receive and intake, encapsulate, and forward the DHCP call to the NG 5400, and process the return message back to the DHCP virtual client 5250 to facilitate communication 5800 between the DHCP virtual client 5250 and the NG 5400. In implementations, a failure determination may be indicated after a defined number of failed attempts to obtain the IP address.

In either case of failover testing, successful processing by the layer 3 tunnel instantiation device being tested validates to the other or partner layer 3 tunnel instantiation device that layer 3 tunnel instantiation device being tested is functioning properly and able to service client requests. Successful processing validates the multiple functions necessary for end-to-end communication between the DHCP virtual client (simulated client traffic), over or using the local network (VLAN infrastructure), the layer 3 tunnel instantiation device being tested, and the NG. In implementations, the failover testing can further include quality of service testing of the pathway under test, where the pathway under test includes, but is not limited to, the local network (VLAN infrastructure), the layer 3 tunnel instantiation device being tested, and the NG.

In implementations, in the event of successful failover testing, a status of the layer 3 tunnel instantiation device being tested can be set to standby, good, or online (standby mode) or active mode. If the layer 3 tunnel instantiation device being tested was in active mode, then it may remain in active mode or be switched to standby mode (assuming the partner layer 3 tunnel instantiation device is in standby mode). If the layer 3 tunnel instantiation device being tested was in standby mode, then it may remain in standby mode or be switched to active mode. Any switching is automatically done by the layer 3 tunnel instantiation devices.

In implementations, in the event of successful failover testing, a status of the layer 3 tunnel instantiation device being tested can be set to standby, good, or online (standby mode) or active mode. If the layer 3 tunnel instantiation device being tested was in active mode, then it may remain in active mode or be switched to standby mode (assuming the partner layer 3 tunnel instantiation device is in standby mode). If the layer 3 tunnel instantiation device being tested was in standby mode, then it may remain in standby mode or be switched to active mode.

In implementations, in the event of detecting a failed layer 3 tunnel instantiation device, the status of the layer 3 tunnel instantiation device being tested is set to bad, offline, or inactive (offline mode). If the layer 3 tunnel instantiation device being tested was the active layer 3 tunnel instantiation device, then the partner layer 3 tunnel instantiation device is switched to active mode. Any switching is automatically done by the layer 3 tunnel instantiation devices. In implementations, the failed layer 3 tunnel instantiation device can be brought back to standby mode or active mode, as appropriate, after a successful failover testing.

In implementations, a timer in the respective layer 3 tunnel instantiation device can be used to initiate failover testing. The timer can be reset upon completion of the failure testing. In implementations, failover testing can be timer-based, on-demand, and/or combinations thereof. In implementations, switching between layer 3 tunnel instantiation devices can be done after a defined time period, defined number of failover tests, on-demand, and/or combinations thereof.

Figure 6:
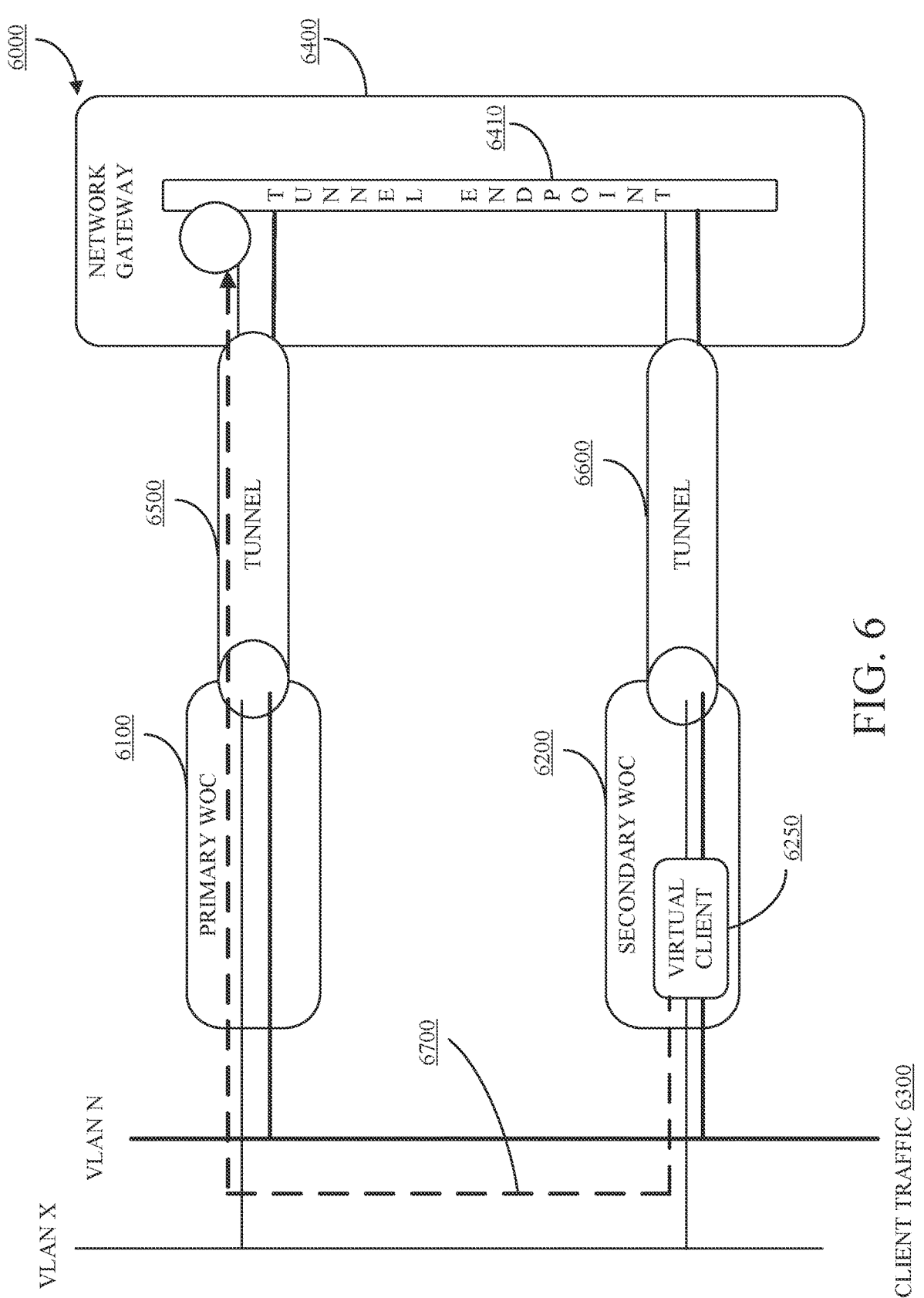
FIG. 6 is a block diagram of an example of a redundant configuration for layer 3 tunnel instantiation devices with failover testing in accordance with embodiments of this disclosure.

FIG. 6 is a block diagram of an example network architecture 6000 which includes a primary layer 3 tunnel instantiation device 6100 and a secondary layer 3 tunnel instantiation device 6200 in a redundant or failover configuration in accordance with embodiments of this disclosure. The network architecture 6000 can include client traffic 6300 coming from user devices and access points over VLAN X and VLAN Y as described herein. The client traffic 6300 is processed or handled by an active one of the primary layer 3 tunnel instantiation device 6100 and the secondary layer 3 tunnel instantiation device 6200 as described herein, and directed to a network gateway 6400 for handling as described herein. The network architecture 6000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

Each of the layer 3 tunnel instantiation device 6100 and the layer 3 tunnel instantiation device 6200 can be the layer 3 tunnel instantiation device 2800, the layer 3 tunnel instantiation device 3100, the layer 3 tunnel instantiation device 3200, the layer 3 tunnel instantiation device 5100, and/or the layer 3 tunnel instantiation device 5200.

The network gateway 6400 can perform as a far-end tunnel endpoint 6410 of a layer 3 tunnel 6500 and 6600, as applicable, and can facilitate layer 3 gateway services, such as access to the Internet, for the client traffic 6300. The network gateway 6400 can provide offload gateway and network anchoring functions to the devices sending the client traffic 6300.

Each of the primary layer 3 tunnel instantiation device 6100 and the secondary layer 3 tunnel instantiation device 6200 can implement heartbeat or failover signaling as described herein to determine a functional and/or operational health of the other of the primary layer 3 tunnel instantiation device 6100 and the secondary layer 3 tunnel instantiation device 6200. This is implemented, in part, by having each of the primary layer 3 tunnel instantiation device 6100 and the secondary layer 3 tunnel instantiation device 6200 include a virtual client, such as a DHCP virtual client, as described in FIG. 5. In FIG. 6, the secondary layer 3 tunnel instantiation device 6200 includes a virtual client 6250 which operates and functions as described in FIG. 5.

Operationally, for failover testing, the virtual client 6250 can attempt to do a DHCP call or exchange with the NG 6400 via the primary layer 3 tunnel instantiation device 6100 service connectivity function. The DHCP exchange attempts to obtain an IP address from the NG 6400 using the primary layer 3 tunnel instantiation device 6100. The primary layer 3 tunnel instantiation device 6100 attempts to process the DHCP call, e.g., DHCP discover message, and facilitate communication 6700 between the virtual client 6250 and the NG 6400. If the DHCP call is successfully processed by the primary layer 3 tunnel instantiation device 6100, this validates to the secondary layer 3 tunnel instantiation device 6200 that the primary layer 3 tunnel instantiation device 6100 is functioning properly and able to service client requests. Successful processing validates the multiple functions necessary for end-to-end communication between the DHCP virtual client 6250 (simulated client traffic), over or using the local network (VLAN infrastructure), the primary layer 3 tunnel instantiation device 6100, and the NG 6400.

Figure 7:
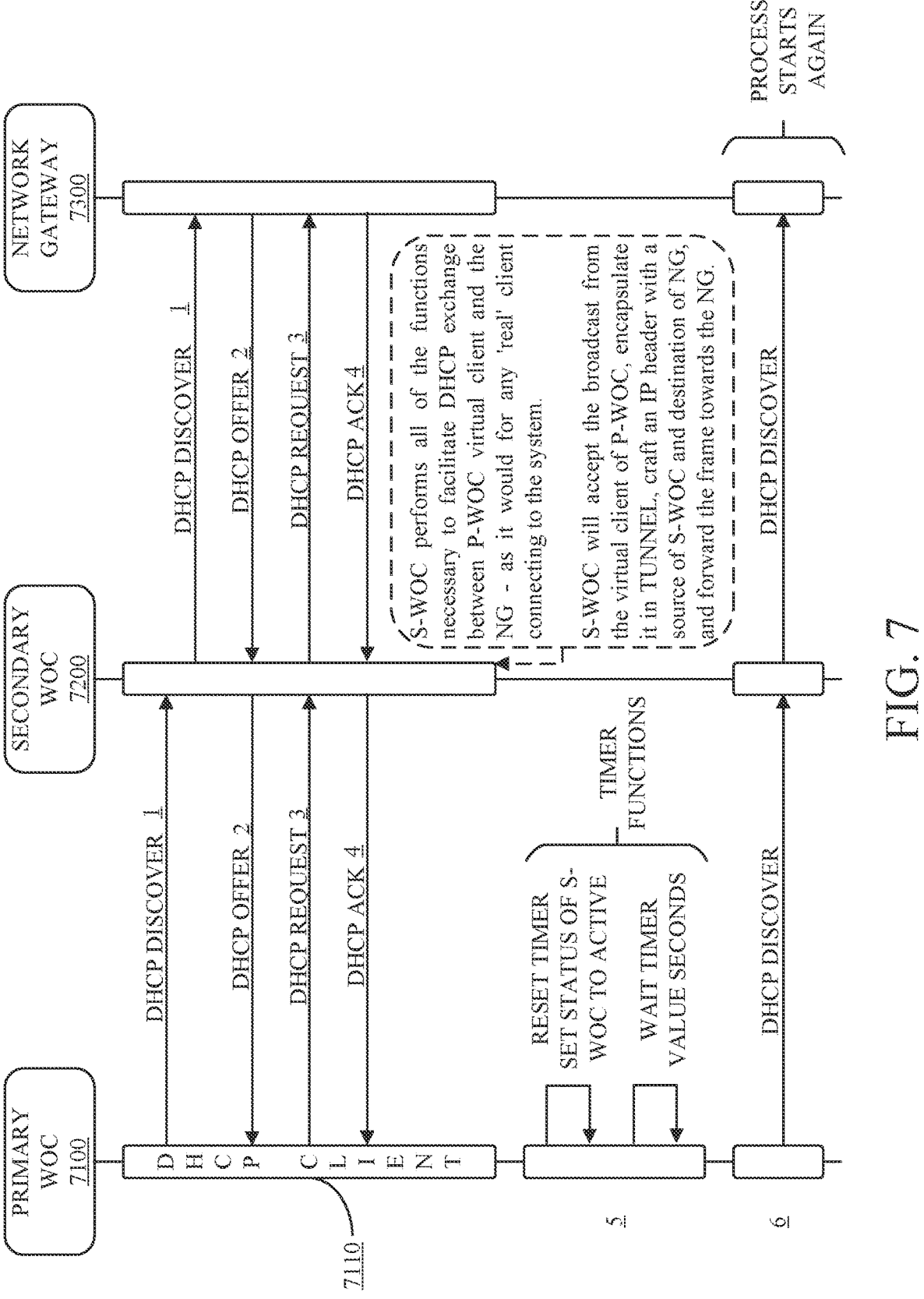
FIG. 7 is a flow diagram of an example flow for failover testing for redundant configuration for layer 3 tunnel instantiation devices in accordance with embodiments of this disclosure.

FIG. 7 is a flow diagram of an example flow 7000 for failover testing for redundant configuration for layer 3 tunnel instantiation devices in accordance with embodiments of this disclosure. In implementations, the flow 7000 is illustrated between a primary layer 3 tunnel instantiation device 7100, a secondary layer 3 tunnel instantiation device 7200, and a network gateway 7300.

A virtual client, such as DHCP client 7110 at the primary layer 3 tunnel instantiation device 7100, can send a DHCP discover message to the network gateway 7300 via a local network and the secondary layer 3 tunnel instantiation device 7200. The local network can be a VLAN which includes VLAN channels and/or tags for client traffic/user devices (client VLAN channels) and dedicated VLAN channels for failover testing. The dedicated VLAN channels are separate from the client VLAN channels.

To complete a transaction which results in obtaining an IP address from the network gateway 7300, the DHCP client 7110 and/or the primary layer 3 tunnel instantiation device 7100 exchange, at least a DHCP offer message (2), a DHCP request message (3), and a DHCP ACK message (4). Successful completion of these messages means that the secondary layer 3 tunnel instantiation device 7200 is functionally and/or operating correctly with respect to receiving the simulated traffic from the primary layer 3 tunnel instantiation device 7100, processing the simulated traffic in terms of encapsulating frames of the simulated traffic, and forwarding or communicating the encapsulated traffic via a layer 3 tunnel to the network gateway 7300. This checks the multiple end-to-end processes necessary for communications between a client/simulated client and the network gateway 7300. In implementations, quality of service can be tested. For example, latency, error percentage, and/or other metrics. In implementations, a reverse traffic flow from the network gateway 7300 to the DHCP client 7110 may also be checked.

Upon successful completion (5), the DHCP client 7110 and/or the primary layer 3 tunnel instantiation device 7100 can set a status of the secondary layer 3 tunnel instantiation device 7200 to standby, good, or online (standby mode). If the secondary layer 3 tunnel instantiation device 7200 was the active layer 3 tunnel instantiation device (active mode), then the secondary layer 3 tunnel instantiation device 7200 can remain in active mode. In implementations, the secondary layer 3 tunnel instantiation device 7200 was in standby mode, then the secondary layer 3 tunnel instantiation device 7200 can remain in standby mode. The DHCP client 7110 and/or the primary layer 3 tunnel instantiation device 7100 can set a wait timer to a defined value to start the failover testing again (6).

Unsuccessful completion of one or more of the messages (1-4) means that the secondary layer 3 tunnel instantiation device 7200 is not capable of serving client traffic. In implementations, the DHCP client 7110 and/or the primary layer 3 tunnel instantiation device 7100 can attempt to complete the DHCP transaction a defined number of times before indicating or declaring that the secondary layer 3 tunnel instantiation device 7200 has failed. Upon detecting failure of the secondary layer 3 tunnel instantiation device 7200, the DHCP client 7110 and/or the primary layer 3 tunnel instantiation device 7100 can set a status of the secondary layer 3 tunnel instantiation device 7200 to fail or offline (inactive mode). In implementations, upon successful retesting of the secondary layer 3 tunnel instantiation device 7200, the DHCP client 7110 and/or the primary layer 3 tunnel instantiation device 7100 can set a status of the secondary layer 3 tunnel instantiation device 7200 to standby or active mode, as applicable.

As noted, the failover testing can be initiated after expiration of the reset timer. In implementations, the failover testing can be initiated on-demand as appropriate or applicable. In implementations, the failover testing can result in switching which layer 3 tunnel instantiation device is in active mode and which one is in standby mode. In implementations, switching can be done after a defined number of failover tests. In implementations, switching can be done after a defined number of successful failover tests. In implementations, switching can be done based on a quality of service metric.

Figure 8:
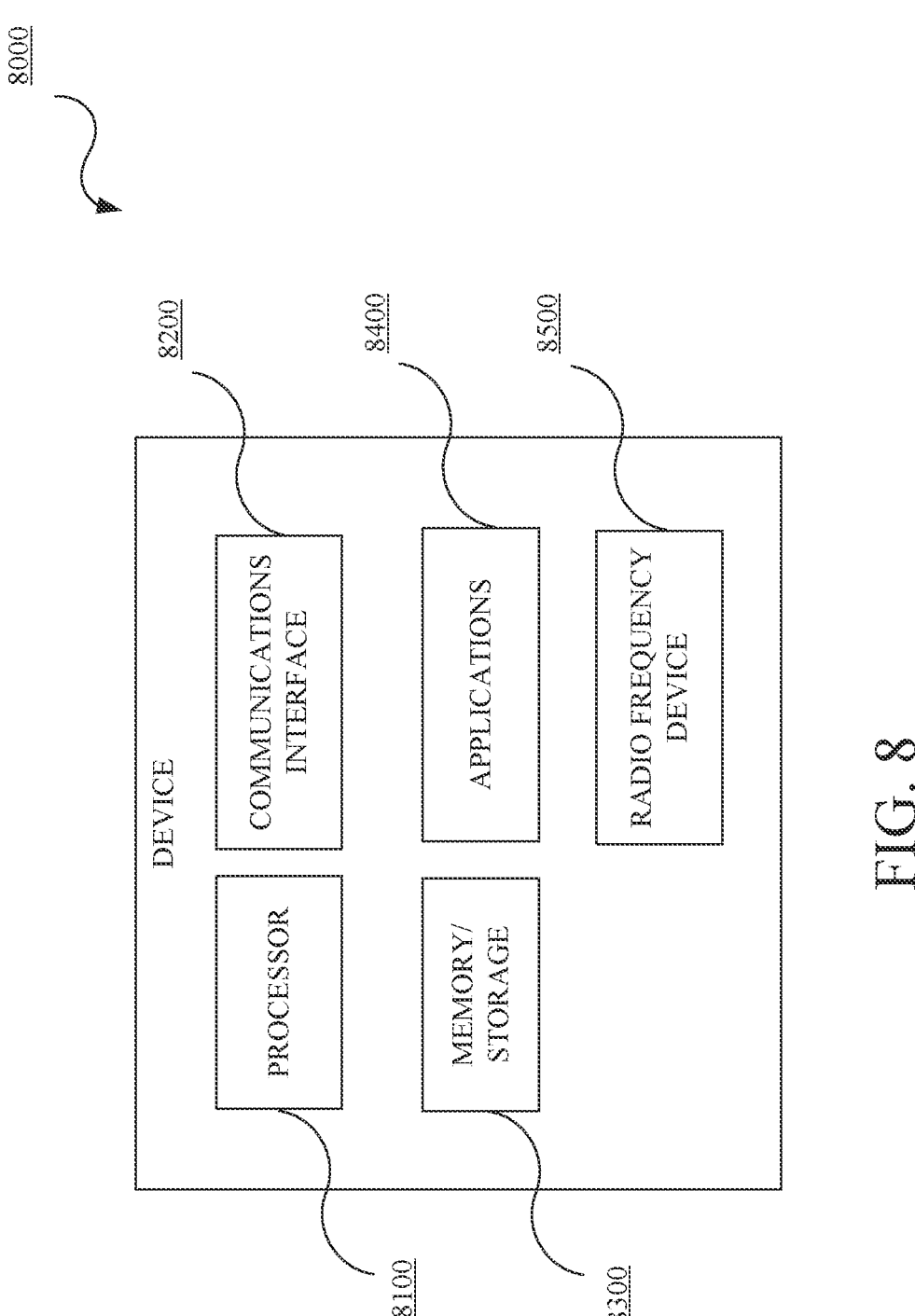
FIG. 8 is a block diagram of an example of a user device in accordance with embodiments of this disclosure.

FIG. 8 is a block diagram of an example of a device 8000 in accordance with embodiments of this disclosure. The device 8000 may include, but is not limited to, a processor 8100, a memory/storage 8200, a communication interface 8300, applications 8400, and a radio frequency device 8500. The device 8000 may include or implement, for example, any of the user devices 1, 2, . . . , N 2200 and 2210, the AP 2100, the NG 2400, the NG 3400, the devices for client traffic 3300, the NG 5400, the devices for client traffic 5300, the NG 6400, the devices for client traffic 6300, and the NG 7300. The applicable or appropriate techniques or methods described herein may be stored in the memory/storage 8200 and executed by the processor 8100 in cooperation with the memory/storage 8200, the communications interface 8300, the applications 8400, and the radio frequency device 8500, as appropriate. The device 8000 may 8000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 9:
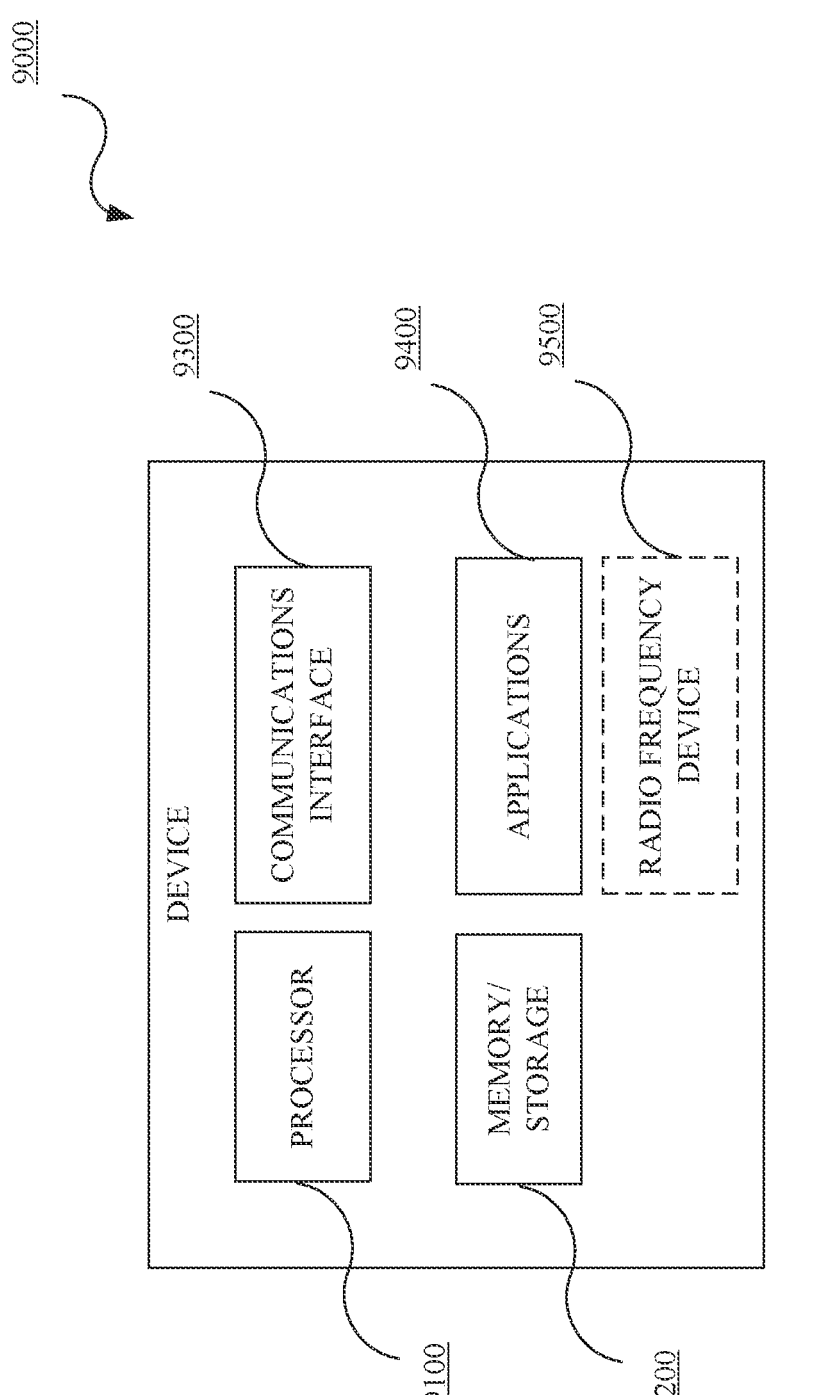
FIG. 9 is a block diagram of an example of a device in accordance with embodiments of this disclosure.

FIG. 9 is a block diagram of an example of a device 9000 in accordance with embodiments of this disclosure. The device 9000 may include, but is not limited to, a processor 9100, a memory/storage 9200, a communication interface 9300, and applications 9400. In an implementation, the device 9000 may include a radio frequency device 9500. The device 9000 may include or implement, for example, the NG 2400, the layer 3 tunnel instantiation device 2800, the layer 3 tunnel instantiation device 3100, the layer 3 tunnel instantiation device 3200, the NG 3400, the layer 3 tunnel instantiation device 5100, the layer 3 tunnel instantiation device 5200, the NG 5400, the layer 3 tunnel instantiation device 6100, the layer 3 tunnel instantiation device 6200, the NG 6400, the layer 3 tunnel instantiation device 7100, the layer 3 tunnel instantiation device 7200, and/or the NG 7300. The applicable or appropriate techniques or methods described herein may be stored in the memory/storage 9200 and executed by the processor 9100 in cooperation with the memory/storage 9200, the communications interface 9300, the applications 9400, and the radio frequency device 9500 (when applicable), as appropriate. The device 9000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 10:
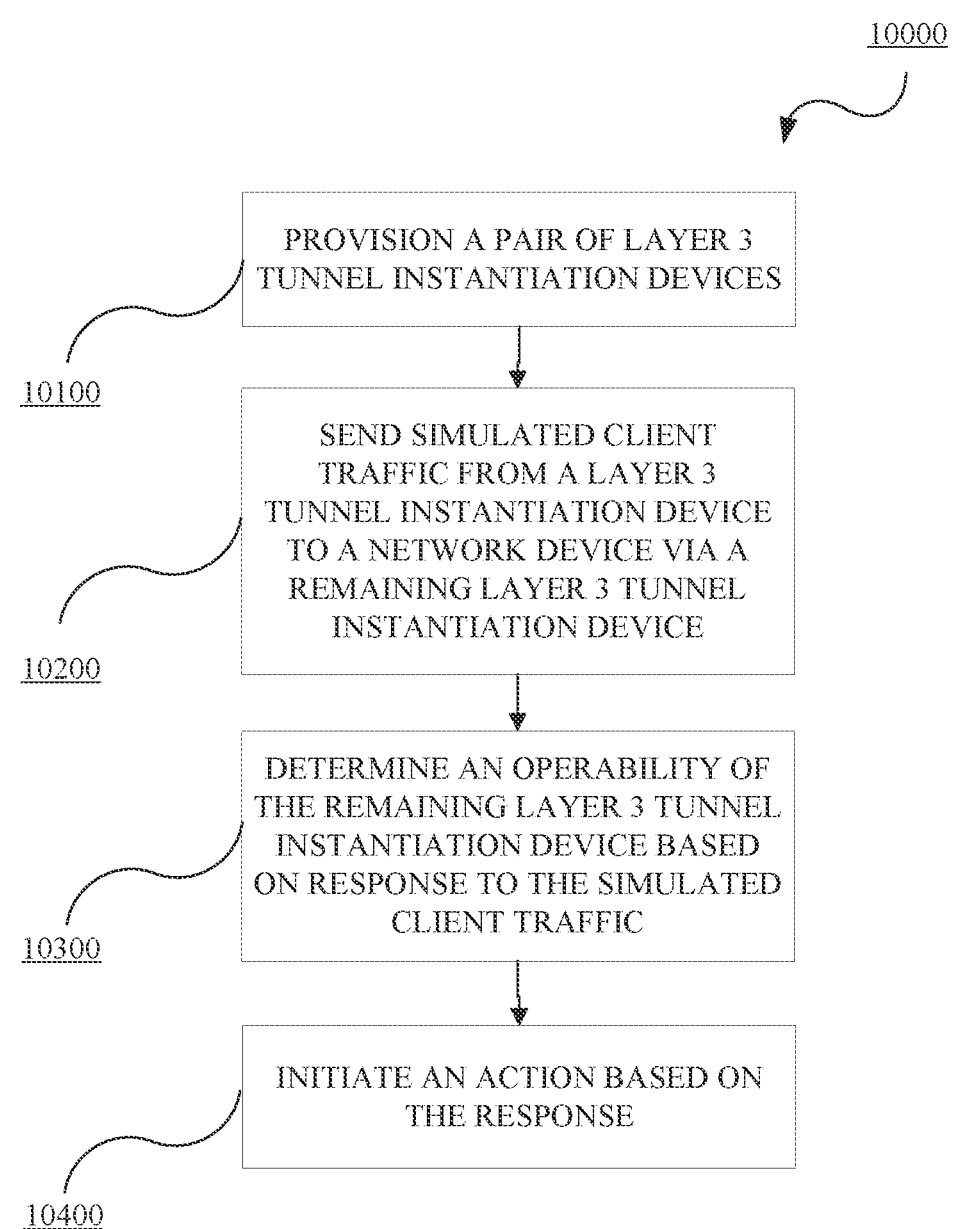
FIG. 10 is a flowchart of an example method for failover testing a flexible nodal layer 3 overlay of layer 2 traffic device in accordance with embodiments of this disclosure.

FIG. 10 is a flowchart of an example method 10000 for failover testing of layer 3 tunnel instantiation devices in accordance with embodiments of this disclosure. The method 10000 includes: provisioning 10100 a pair of layer 3 tunnel instantiation devices; sending 10200 simulated client traffic from a layer 3 tunnel instantiation device to a network device via a remaining layer 3 tunnel instantiation device; determining 10300 an operability of the remaining layer 3 tunnel instantiation device based on response to the simulated client traffic; and initiating 10400 an action based on the response. For example, the technique 10000 may be implemented, as applicable and appropriate, by the network architecture 2000 and elements therein, by the network architecture 3000 and elements therein, by the network architecture 5000 and elements therein, by the network architecture 5000 and elements therein, the primary layer 3 tunnel instantiation device 7100, the secondary layer 3 tunnel instantiation device 7200, the network gateway 7300, the device 8000, and/or the device 9000, as appropriate and applicable.

The method 10000 includes provisioning 10100 a pair of layer 3 tunnel instantiation devices. A network site is deployed with a pair of layer 3 tunnel instantiation devices to encapsulate layer 2 traffic into layer 3 traffic, and provide a first tunnel endpoint for a layer 3 tunnel to establish a demarcation point between a layer 2 domain and a layer 3 domain, the first tunnel endpoint connected to a second tunnel endpoint instantiated at a network gateway. One of the pair of layer 3 tunnel instantiation devices is in active mode and another one is in standby mode. That is, redundancy is provided in the event of layer 3 tunnel instantiation device failure.

The method 10000 includes sending 10200 simulated client traffic from a layer 3 tunnel instantiation device to a network device via a remaining layer 3 tunnel instantiation device. Failover or health testing of each layer 3 tunnel instantiation device by the other layer 3 tunnel instantiation device is implemented by provisioning each layer 3 tunnel instantiation device with a virtual client which can send simulated client traffic toward a network gateway using the other layer 3 tunnel instantiation device. In implementations, the virtual client is a DHCP client. The DHCP client can initiate a DHCP message exchange or transaction to obtain an IP address from the network gateway. The simulated client traffic is sent over the pathway that is used by client traffic. The pathway includes the local network, the to be tested layer 3 tunnel instantiation device, and the network gateway. In implementations, the local network is a VLAN. In implementations, dedicated VLAN channels, which are separate from VLAN channels used for client traffic from user or end devices, are used for failover testing. Each virtual client has a separate local network or VLAN channel. The VLAN channels used for client traffic from user or end devices and the dedicated VLAN channels use the same VLAN logical and physical infrastructure.

The method 10000 includes determining 10300 an operability of the remaining layer 3 tunnel instantiation device based on a response to the simulated client traffic. The simulated client traffic is processed by the remaining layer 3 tunnel instantiation device, where processing includes at least testing functional operation of the layer 3 tunnel instantiation device's internal trunk and physical interface, functional operation of the layer 3 tunnel instantiation device's bridge interface and layer 2 forwarding function, and functional operation of the layer 3 tunnel instantiation device's tunneling encapsulation/deencapsulation. The encapsulated simulated client traffic is processed by the network gateway, where processing includes at least testing the functional operation of the network gateway tunnel service endpoint, and the functional operation of the network gateway subscriber management and policy functions.

The simulated client traffic is sent over the local network and includes at least testing of the functional operation of the local network between the partner layer 3 tunnel instantiation devices. Operability testing also includes at least testing of the functional operation of a core authentication, authorization, and accounting (AAA) servers, subscriber databases, and policy control, the functional operation of a connecting network between the partner layer 3 tunnel instantiation devices and the network gateway, the functional operation of a connecting network between the partner layer 3 tunnel instantiation devices and national datacenters, core, and/or back office infrastructure (core infrastructure), and/or the functional operation of subscriber services provided by the network gateway. In implementations, the response can include, but is not limited to, receiving no response, receiving a response message with requested information, receiving a response message with an IP address, receiving incomplete response message sequence, receiving error message, and/or combinations thereof. In implementations, the error message may indicate locality of error generation. In implementations, the response can include quality of service metrics. The response is indicative of or is an indicator of a positive outcome or a negative outcome.

The method 10000 includes initiating 10400 an action based on the response. In implementations, the virtual client and/or the layer 3 tunnel instantiation device can track a number of attempts prior to taking an action. In implementations, the number of attempts is configurable. The virtual client and/or the layer 3 tunnel instantiation device can set a status of standby, active, or offline based on the response. In implementations, the virtual client and/or the layer 3 tunnel instantiation device can switch which of the layer 3 tunnel instantiation devices is to be active based on the response, the quality of service, and/or combinations thereof. In implementations, the virtual client and/or the layer 3 tunnel instantiation device can reset a failover testing timer. In implementations, the failover testing timer is configurable.

The described methods and systems for redundant configuration and testing for flexible nodal layer 3 overlay of layer 2 traffic can include a local network configured to carry layer 2 traffic, a pair of layer 3 tunnel instantiation devices deployed in a failover configuration, each layer 3 tunnel instantiation device configured to encapsulate the layer 2 traffic into layer 3 traffic and forward the layer 3 traffic to a network gateway using a configurable layer 3 tunnel, and a virtual client provisioned on each layer 3 tunnel instantiation device of the pair of layer 3 tunnel instantiation devices, each virtual client configured to send simulated client traffic to the network gateway via the local network and a partner layer 3 tunnel instantiation device of the pair of layer 3 tunnel instantiation devices to check end-to-end operability of the local network, the partner layer 3 tunnel instantiation device, and the network gateway, where a testing layer 3 tunnel instantiation device of the pair of layer 3 tunnel instantiation devices is configured to initiate an action with respect to the partner layer 3 tunnel instantiation device based on a response to the simulated client traffic.

In implementations, the virtual client is a virtual Dynamic Host Configuration Protocol (DHCP) client. In implementations, the simulated client traffic includes at least Dynamic Host Configuration Protocol (DHCP) transaction messages to obtain an Internet Protocol (IP) address from the network gateway. In implementations, the local network is a virtual local area network (VLAN) which includes VLAN channels for devices sending client traffic and dedicated VLAN channels for each of the virtual clients. In implementations, the local network includes local network channels for client traffic and separate local network channels for each of the virtual clients. In implementations, the end-to-end operability includes at least testing functional operation of the partner layer 3 tunnel instantiation device's internal trunk and physical interface, functional operation of the partner layer 3 tunnel instantiation device's bridge interface and layer 2 forwarding function, and functional operation of the partner layer 3 tunnel instantiation device's tunneling encapsulation/deencapsulation. In implementations, the end-to-end operability includes at least testing functional operation of a tunnel service endpoint at the network gateway, functional operation of subscriber management and policy functions at the network gateway, and functional operation of subscriber services provided by the network gateway. In implementations, the end-to-end operability includes at least testing functional operation of a core authentication, authorization, and accounting (AAA) servers, subscriber databases, and policy control. In implementations, the end-to-end operability includes at least testing functional operation of a connecting network between the partner layer 3 tunnel instantiation device and the network gateway, and functional operation of a connecting network between the partner layer 3 tunnel instantiation device and core infrastructure. In implementations, the action switches the partner layer 3 tunnel instantiation device from an active mode to an offline mode when the response indicates a negative outcome. In implementations, the action sets a status of standby, active, or offline based on an outcome indicated by the response. In implementations, the network further includes a timer provisioned on each layer 3 tunnel instantiation device of the pair of layer 3 tunnel instantiation devices to initiate failover testing by sending the simulated client traffic.

The described methods and systems for redundant configuration and testing for flexible nodal layer 3 overlay of layer 2 traffic can include a method for failover testing of redundant configurable endpoint constructors. The method includes sending, by a virtual client on a first configurable endpoint constructor to a network gateway via a local network and a second configurable endpoint constructor, simulated layer 2 traffic to check end-to-end operability of the local network, the second configurable endpoint constructor, and the network gateway, wherein the first configurable endpoint constructor and the second configurable endpoint constructor are configured to encapsulate layer 2 traffic into layer 3 traffic and forward the layer 3 traffic to the network gateway using a configurable layer 3 tunnel, and initiating, by the virtual client or the first configurable endpoint constructor, an action with respect to the second configurable endpoint constructor based on a response to the simulated layer 2 traffic.

In implementations, the simulated layer 2 traffic includes at least Dynamic Host Configuration Protocol (DHCP) transaction messages to obtain an Internet Protocol (IP) address from the network gateway. In implementations, the local network is a virtual local area network (VLAN) which includes VLAN channels for devices which send the layer 2 traffic and dedicated VLAN channels for the virtual client provisioned on the first configurable endpoint constructor and a virtual provisioned on the second configurable endpoint constructor. In implementations, the method further includes sending, by a virtual client on the second configurable endpoint constructor to the network gateway via the local network and the first configurable endpoint constructor, simulated layer 2 traffic to check end-to-end operability of the local network, the first configurable endpoint constructor, and the network gateway, and initiating, by the virtual client on the second configurable endpoint constructor or the second configurable endpoint constructor, an action with respect to the first configurable endpoint constructor based on a response to the simulated layer 2 traffic sent to the network gateway from the virtual client on the second configurable endpoint constructor. In implementations, the end-to-end operability includes at least testing functional operation of the partner layer 3 tunnel instantiation device's internal trunk and physical interface, functional operation of the partner layer 3 tunnel instantiation device's bridge interface and layer 2 forwarding function, and functional operation of the partner layer 3 tunnel instantiation device's tunneling encapsulation/deencapsulation. In implementations, the action switches the second configurable endpoint constructor from an active mode to an offline mode when the response indicates a negative outcome. In implementations, the sending is triggered by a timer to initiate failover testing.

The described methods and systems for redundant configuration and testing for flexible nodal layer 3 overlay of layer 2 traffic can include a device. The device includes a primary layer 3 tunnel instantiation device including a virtual client and a secondary layer 3 tunnel instantiation device including a virtual client, where the primary layer 3 tunnel instantiation device and the secondary layer 3 tunnel instantiation device are configured to encapsulate layer 2 traffic into layer 3 traffic and forward the layer 3 traffic to a network gateway using a flexibly deployable layer 3 tunnel, where the virtual client of the primary layer 3 tunnel instantiation device or the virtual client of the secondary layer 3 tunnel instantiation device is configured to send simulated layer 2 traffic to the network gateway via a local network and the secondary layer 3 tunnel instantiation device or via the local network and the primary layer 3 tunnel instantiation device, respectively, to check end-to-end operability of the local network, the secondary layer 3 tunnel instantiation device or the primary layer 3 tunnel instantiation device, respectively, and the network gateway.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A network deployed at a site, comprising:
a local network configured to carry layer 2 traffic;
a pair of layer 3 tunnel instantiation devices deployed in a failover configuration, each layer 3 tunnel instantiation device configured to encapsulate the layer 2 traffic into layer 3 traffic and forward the layer 3 traffic to a network gateway using a configurable layer 3 tunnel; and
a virtual client provisioned on each layer 3 tunnel instantiation device of the pair of layer 3 tunnel instantiation devices, each virtual client configured to send simulated client traffic to the network gateway via the local network and a partner layer 3 tunnel instantiation device of the pair of layer 3 tunnel instantiation devices to check end-to-end operability of the local network, the partner layer 3 tunnel instantiation device, and the network gateway,
wherein a testing layer 3 tunnel instantiation device of the pair of layer 3 tunnel instantiation devices is configured to initiate an action to set a status of the partner layer 3 tunnel instantiation device based on a response to the simulated client traffic.

2. The network of claim 1, wherein the virtual client is a virtual Dynamic Host Configuration Protocol (DHCP) client.

3. The network of claim 1, wherein the simulated client traffic includes at least Dynamic Host Configuration Protocol (DHCP) transaction messages to obtain an Internet Protocol (IP) address from the network gateway.

4. The network of claim 3, wherein the local network is a virtual local area network (VLAN) which includes VLAN channels for devices sending client traffic and dedicated VLAN channels for each of the virtual clients.

5. The network of claim 1, wherein the local network includes local network channels for client traffic and separate local network channels for each of the virtual clients.

6. The network of claim 1, wherein the end-to-end operability includes at least testing functional operation of an internal trunk and physical interface of the partner layer 3 tunnel instantiation device, functional operation of a bridge interface and layer 2 forwarding function of the partner layer 3 tunnel instantiation device, and functional operation of tunneling encapsulation/deencapsulation of the partner layer 3 tunnel instantiation device.

7. The network of claim 6, wherein the end-to-end operability includes at least testing functional operation of a tunnel service endpoint at the network gateway, functional operation of subscriber management and policy functions at the network gateway, and functional operation of subscriber services provided by the network gateway.

8. The network of claim 7, wherein the end-to-end operability includes at least testing functional operation of a core authentication, authorization, and accounting (AAA) servers, subscriber databases, and policy control.

9. The network of claim 8, wherein the end-to-end operability includes at least testing functional operation of a connecting network between the partner layer 3 tunnel instantiation device and the network gateway, and functional operation of a connecting network between the partner layer 3 tunnel instantiation device and core infrastructure.

10. The network of claim 1, wherein the action switches the partner layer 3 tunnel instantiation device from an active mode to an offline mode when the response indicates a negative outcome.

11. The network of claim 1, wherein the action sets a status of standby, active, or offline based on an outcome indicated by the response.

12. The network of claim 1, further comprising:
a timer provisioned on each layer 3 tunnel instantiation device of the pair of layer 3 tunnel instantiation devices to initiate failover testing by sending the simulated client traffic.

13. A method for failover testing of redundant configurable endpoint constructors, the method comprising:
sending, by a virtual client on a first configurable endpoint constructor to a network gateway via a local network and a second configurable endpoint constructor, simulated layer 2 traffic to check end-to-end operability of the local network, the second configurable endpoint constructor, and the network gateway, wherein the first configurable endpoint constructor and the second configurable endpoint constructor are configured to encapsulate layer 2 traffic into layer 3 traffic and forward the layer 3 traffic to the network gateway using a configurable layer 3 tunnel; and
initiating, by the virtual client or the first configurable endpoint constructor, an action to set a status of the second configurable endpoint constructor based on a response to the simulated layer 2 traffic.

14. The method of claim 13, wherein the simulated layer 2 traffic includes at least Dynamic Host Configuration Protocol (DHCP) transaction messages to obtain an Internet Protocol (IP) address from the network gateway.

15. The method of claim 13, wherein the local network is a virtual local area network (VLAN) which includes VLAN channels for devices which send the layer 2 traffic and dedicated VLAN channels for the virtual client provisioned on the first configurable endpoint constructor and a virtual client provisioned on the second configurable endpoint constructor.

16. The method of claim 13, further comprising:
sending, by a virtual client on the second configurable endpoint constructor to the network gateway via the local network and the first configurable endpoint constructor, simulated layer 2 traffic to check end-to-end operability of the local network, the first configurable endpoint constructor, and the network gateway; and
initiating, by the virtual client on the second configurable endpoint constructor or the second configurable endpoint constructor, an action with respect to the first configurable endpoint constructor based on a response to the simulated layer 2 traffic sent to the network gateway from the virtual client on the second configurable endpoint constructor.

17. The method of claim 15, wherein the end-to-end operability includes at least testing functional operation of an internal trunk and physical interface of the second configurable endpoint constructor, functional operation of a bridge interface and layer 2 forwarding function of the second configurable endpoint constructor, and functional operation of tunneling encapsulation/deencapsulation of the second configurable endpoint constructor.

18. The method of claim 13, wherein the action switches the second configurable endpoint constructor from an active mode to an offline mode when the response indicates a negative outcome.

19. The method of claim 13, wherein the sending is triggered by a timer to initiate failover testing.

20. A device, comprising:
a primary layer 3 tunnel instantiation device including a virtual client; and
a secondary layer 3 tunnel instantiation device including a virtual client, wherein the primary layer 3 tunnel instantiation device and the secondary layer 3 tunnel instantiation device are configured to encapsulate layer 2 traffic into layer 3 traffic and forward the layer 3 traffic to a network gateway using a flexibly deployable layer 3 tunnel,
wherein the virtual client of the primary layer 3 tunnel instantiation device or the virtual client of the secondary layer 3 tunnel instantiation device is configured to send simulated layer 2 traffic to the network gateway via a local network and the secondary layer 3 tunnel instantiation device or via the local network and the primary layer 3 tunnel instantiation device, respectively, to check end-to-end operability of the local network, the secondary layer 3 tunnel instantiation device or the primary layer 3 tunnel instantiation device, respectively, and the network gateway, and
wherein the primary layer 3 tunnel instantiation device is configured to initiate an action to set a status of the secondary layer 3 tunnel instantiation device based on a response to the simulated layer 2 traffic, or the secondary layer 3 tunnel instantiation device is configured to initiate an action to set a status of the primary layer 3 tunnel instantiation device based on the response to the simulated layer 2 traffic.

* * * * *